United States Patent [19]

Chen

[11] 4,297,191
[45] Oct. 27, 1981

[54] ISOTOPIC SEPARATION

[75] Inventor: Cheng-Lin Chen, Pittsburgh, Pa.

[73] Assignee: Westinghouse Electric Corp., Pittsburgh, Pa.

[21] Appl. No.: 70,939

[22] Filed: Aug. 30, 1979

Related U.S. Application Data

[62] Division of Ser. No. 864,344, Dec. 27, 1977.

[51] Int. Cl.³ .......................................... B01D 59/00
[52] U.S. Cl. ........................................ 204/193; 55/17;
204/157.1 R; 204/DIG. 11; 250/284; 250/298;
250/423 P
[58] Field of Search ................... 250/423 P, 298, 284;
204/157.1 R, 193, DIG. 11; 55/17

[56] References Cited

U.S. PATENT DOCUMENTS

| | | | |
|---|---|---|---|
| 3,559,373 | 2/1971 | Garrett | 55/9 |
| 3,877,892 | 4/1975 | Bley et al. | 55/17 |
| 3,989,483 | 11/1976 | Becker et al. | 55/17 |
| 4,024,217 | 5/1977 | Wexler et al. | 204/157.1 R X |
| 4,070,580 | 1/1978 | Gallagher et al. | 250/423 P |
| 4,090,856 | 5/1978 | Rogoff | 250/423 P |
| 4,101,396 | 7/1978 | Silfvast | 204/157.1 R |
| 4,107,537 | 10/1976 | Forsen et al. | 250/423 P |
| 4,110,182 | 8/1978 | Stevens | 204/157.1 R |
| 4,158,775 | 6/1979 | Frosch | 250/423 P |
| 4,176,025 | 11/1979 | Chen et al. | 250/423 P |

Primary Examiner—Richard E. Schafer
Attorney, Agent, or Firm—Edward L. Levine

[57] ABSTRACT

Method and apparatus for separating isotopes in an isotopic mixture. Photo-excitation of selected isotopic species is utilized in conjunction with various processes including reaction of the excited species with positive ions of predetermined ionization energy, other excited species or free electrons. The products of the reactions include forms of the selected isotopic species which are different than their form prior to excitation, including different mass, charge or chemical make-up. The selected species is then separated from the balance of the reaction products. Ions and electrons are produced by an electrical discharge, and separation is achieved through radial ambipolar diffusion, electrostatic or magnetohydrodynamic techniques.

2 Claims, 7 Drawing Figures

ISOTOPIC SEPARATION

CROSS REFERENCE TO RELATED APPLICATIONS

This is a division of application Ser. No. 864,344, filed Dec. 27, 1977.

This application is related to copending application U.S. Ser. No. 608,306, filed Aug. 27, 1975 in the name of Cheng-Lin Chen et al., and copending application U.S. Ser. No. 863,202, filed Dec. 22, 1977 in the name of Cheng-Lin Chen, both of which are incorporated herein by reference. The subject matter of the Chen et al. application relates to isotope separation through photoexcitation and dissociative electron attachment processes. The subject matter of the Chen application relates to isotope separation through photo-excitation and reaction processes which increase the mass differential among selected isotopic species.

BACKGROUND OF THE INVENTION

1. Field of the Invention:

This invention relates to isotope separation processes and more particularly to separation processes based upon selective isotopic excitation.

2. Description of the Prior Art:

Selected isotopic species are useful for many purposes including medical apparatus and treatment, tracer studies of chemical and biological processes, and as target materials and fuels for nuclear reactor application. Perhaps the largest present utilization is for nuclear reactors, which typically require, for example, fuel enriched in uranium-235.

The system most widely used today for isotopic separation is gaseous diffusion through a porous barrier, which requires a large, complex, and costly cascading network. More recently systems are being considered based upon technologies such as distillation and photoionization in the presence of magnetic and electric fields. Exemplary of the latter are U.S. Pat. No. 3,772,519 in the name of R. H. Levy et al. and U.S. Pat. No. 3,443,087 in the name of J. Robieux et al.

While such processes offer much promise for increasing the efficiency of isotopic separation processes, it is desirable to provide further alternatives, particularly with a view toward practical application.

SUMMARY OF THE INVENTION

This invention provides additional alternatives to existing and proposed isotope separation techniques. In each of the preferred embodiments, an atomic or molecular isotopic mixture is selectively irradiated so as to selectively excite an isotopic species, preferably through photoexcitation by a laser.

In one embodiment a molecular isotopic species is selectively excited to a preselected internal energy and exposed to positive ions of a predetermined ionization energy. The sum of the internal and ionization energies is sufficiently high to cause a dissociative charge transfer process to occur, releasing as a fragment a positive ion form of the desired isotope. The positive ion is then separated from the balance of the mixture. Preferably, the sum of the ionization energy and the internal energy of the unexcited molecular species in the mixture is below the threshold energy for a dissociative charge transfer process between these constituents so as to decrease the probability for competing processes. This method is particularly applicable to the separation of uranium-235 in a mixture of $U^{235}F_6$ and $U^{238}F_6$.

In another embodiment the positive ion form of the desired isotope, as summarized in the above paragraph, is reacted with a negative ion form of the desired isotope to form a neutral species which is separated from the balance of the mixture. The negative ions are formed by additionally exposing the selectively excited molecular species to free electrons, thereby causing a dissociative electron attachment process.

Another embodiment exposes the selectively excited molecular isotopic species to another excited species such that the sum of the excitation energies is sufficient to cause a dissociative ionization process to occur, resulting in release of a positive ion of the selected isotope. The positive ion form is then separated from the balance of the constituents subsequent to the excitation transfer process by conventional magnetic, electrostatic, electromagnetic or chemical means, in addition to other separation means disclosed.

In other embodiments a near resonance charge transfer process is utilized to separate isotopes in an isotopic, preferably atomic mixture by exposing selectively excited isotopes to positive ions. The sum of the isotope excitation energy and the ionization energy is substantially equal to the ionization energy of the selected isotope, and the resulting resonance charge transfer process releases the selected isotopes as positive ions. The process is advantageously carried out in a discharge tube which creates an ambipolar diffusion field transverse to the tube axis. Under the influence of the field, the desired positive ions drift toward the tube periphery and can therefor be separated from other constituents within the discharge tube. Separation can also be accomplished by flowing the products of the process through a curved passage and a magnetic field, thereby deflecting the desired ions to a collection area separate from the collection area for the balance of constituents.

Separation apparatus is also disclosed which can advantageously be used for such isotope separation processes and includes components positioned to enhance the reactions and efficiency of the processes. A discharge device, such as a pair of electrodes, acts upon a flowing gaseous species to form the initial ions and electrons. The isotopic molecular or atomic species are injected into the flowing afterglow region downstream of the discharge, mixing with the flowing gas, and are then selectively irradiated by a laser. The flowing products are directed along a curved centrifuge path, thereby being deflected to different degrees, and are then collected by segmented areas. In those instances where the desired isotope is in an ionic form, magnetic field directed perpendicular to the flow velocity assists in the deflection, and hence enhances isotopic separation.

The advantages of the inventive embodiments are substantial and include alleviation of the need for an atomic beam as typical in other isotopic separation processes and apparatus. The invention further provides a convenient and practical means, such as electrical discharge, for provision of atomic or molecular ion species, meta-stables or chemical radicals not otherwise readily available for photochemical or other types of isotopic separation. Additionally, as a result of the discharge afterglow, the mean electron energy can be provided over a broad range, compatible with a large number of reaction processes, by varying the point of injection of the isotopic mixture downstream in the afterflow. Further, the energy spread of the electrons in the discharge afterflow at a selected downstream distance is smaller than that typically obtained with an electron beam. Also, the electron density obtainable is substantially higher than the density obtainable with an ordinary electron beam in the same energy range. Complex electron beam formation apparatus is therefor alleviated. Additionally, where the discharge may provide photons of proper energy, a portion of the energy required for the discharge can be extracted as a laser beam to be used for the selective excitation leading to enhancement in the charge and/or mass difference in the selected isotopic species, thereby increasing the overall system efficiency for isotopic separation.

It will be apparent to those skilled in the art that the various processes disclosed herein are not completely efficient. Accordingly, it is to be understood that reference to the terms "separating", "collecting" and the like refer to increasing the concentration or enrichment of the selected isotopic species relative to the feed concentration. Similarly, reference to phrases such as "the balance of constituents" and the like refer to the various fragments, species and reaction products decreased in concentration of the selected isotopic species. And, while the examples provided relate to actions directed primarily toward the desired isotopic species, it will also be apparent that actions can similarly be directed toward an undesired species and also provide isotopic separation.

BRIEF DESCRIPTION OF THE DRAWINGS

The advantages, nature and additional features of the invention will become more apparent from the following description taken in connection with the accompanying drawings in which.

DESCRIPTION OF THE PREFERRED EMBODIMENTS

According to the quasiequilibrium theory of unimolecular decomposition of polyatomic ions, (see, for example, H. M. Rosenstock, M. B. Wallenstein, A. L. Wahshaftig, and H. Eyring, Proc. Natl. Acad. Sci. U.S.A. 38, 667 (1952); H. M. Rosenstock, Adv. Mass Spectrom. 4, 523 (1968); M. L. Vestal, in "Fundamental Process in Radiation Chemistry", edited by P. Ansloos (Wiley, New York, 1968), pp. 59–118; and A. L. Washshaftig, in "Mass Spectrometry", MTP Intnl. Review of Science, edited by A. Maccoll (Butterworths, London, 1972), Physical Chemistry Series One, Vol. 5, pp. 1–24), the fragmentation of such an ion is a function of its total internal energy and is independent of the means by which the ion state is arrived at prior to fragmentation. For example, the dissociative charge transfer process can be written as follows $$A^+ + XY \rightarrow A + (XY^+)^* \rightarrow A'X^+ + Y \qquad (1)$$

where $A^+$ denotes a positive ion, $XY$ is a molecular compound, and the asterisk (*) denotes an excited state.

The positive ion can also be that of a molecular compound, $AB^+$.

The total internal energy of the parent polyatomic ion $(XY^+)^*$ prior to decomposition consists of two parts: the thermal or internal energy of the neutral molecule $XY$ and the ionization energy of $A$ through transfer. The thermal energy and the transferred energy are equivalent in promoting dissociation, since randomization of internal energy is assumed to be extremely fast, on the order of a few hundred vibrational periods, i.e., $10^{-12}$ sec., prior to dissociation.

Experimental evidence (W. A. Chupka, J. Chem. Phys. 54, 1936, 1971; and C. Lifshitz and T. O. Tiernan, J. Chem. Phys. 59, 6143, 1973) showed that the theory is essentially correct. In particular, Lifshitz and Tiernan have found that fragmentation patterns of neopentane, 2-methylpentane, 2,3-dimethyl butane and n-octane all exhibit a strong temperature dependence upon charge exchange with mercury ions $Hg^+$. They observed a factor of two or more increase in the fractional abundance of the dissociated ions by increasing the temperature of the neutral molecules (XY) from 28° C. to 142° C. The increase in the degree of fragmentation of $XY$ to form $X^+$ is believed to be the result of vibrational excitation of the molecule XY.

Accordingly, isotope separation can be accomplished by employing a dissociative charge transfer process as exemplified in reaction (1) and modifying it so that positive ions of the desired isotopic species can be created selectively. This is performed by selective photo-excitation of the desired isotopic species followed by dissociative charge transfer. Assuming for clarity that there are only two isotopic species in the target gas, then by virtue of the isotope shift in the absorption spectrum it is possible to selectively excite one isotopic species over the other, $$h\nu + {}^1XY + {}^2XY \rightarrow ({}^1XY)^* + {}^2XY, \qquad (2)$$

where $h\nu$ denotes the selectively exciting narrow band photoirradiation of chosen wavelength for isotopic species ${}^1XY$ and ${}^1X$ and ${}^2X$ denote different isotopes of an element, and so on throughout the specification.

Since the dissociative charge transfer process depends strongly on the internal excitation of the target molecule, the isotopic ionic species ${}^1X^+$ can be created selectively via the following process $$\begin{aligned} A^+ + ({}^1XY)^{\#} + {}^2XY &\longrightarrow A + ({}^1XY^+)^{\#} + {}^2XY \\ &\longrightarrow A + {}^1X^+ + Y + {}^2XY \end{aligned} \qquad (3)$$

Reaction (3) will occur if the following condition is met: the sum of the ionization energy of A and the internal energy of $({}^1XY)^*$ is above the threshold energy needed for reaction (1), while the sum of the energies of $A^+$ and ${}^2XY$ is below the threshold.

An example of photon enhancement of reaction (1) can be found in uranium hexafluoride ($UF_6$) or sulfur hexafluoride ($SF_6$). It is known that the threshold energy for $SF_5^+$ from $SF_6$ by electron impact is $15.7 \pm 0.8$ eV, (see V. H. Dibler and F. L. Mohler, J. Research Natl. Bureau Standards, 40, 25, 1948) and that the ionization potential for argon is 15.68 eV, (R. C. Weast edited, 'Handbook of Chemistry and Physics", The Chemical Rubber Co.., Cleveland, Ohio, 1968 p. E-69). It has also been found that at room temperature, the $\nu_3$ (943 cm$^{-1}$) mode of vibration of SF$_6$ is in resonance with the P(20) to P(30) lines, (and preferably the P(26) to P(30) lines) $\approx$ 10.6 μm) of the carbon dioxide laser. It is therefore expected that the following reactions will occur:

$$h\nu(0.117\ eV) + SF_6 \rightarrow (SF_6)^* \qquad (4)$$

where the SF$_6$ is a gas at room temperature and $$Ar^+(15.68\ eV) + (SF_6)^* \rightarrow SF_5^+(15.7\ eV) + F \qquad (5)$$

It will be recognized that reaction (5) is a resonance process. Since there is an isotope shift in the absorption spectrum of $^{32}$SF$_6$ and $^{34}$SF$_6$, then isotope separation of $^{32}$S from $^{34}$S is possible by selective excitation of the desired isotopic species. SF$_5^+$ is a stable ion and can be separated and collected by conventional magnetic, electrostatic, electromagnetic, or chemical means, as well as by apparatus discussed hereinafter.

Figure 1:
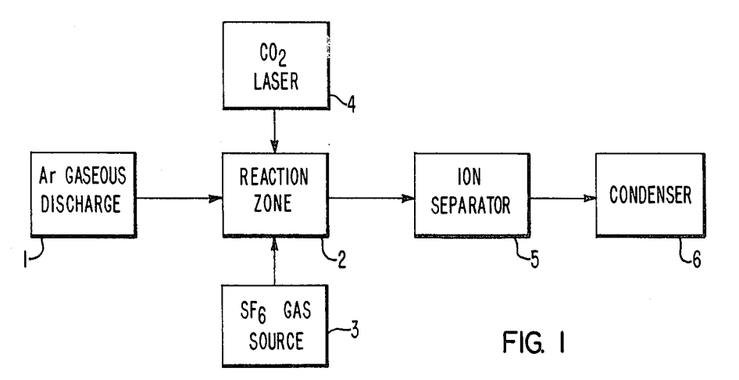
FIG. 1 is a block diagram of an isotope separation process.

A block diagram of the exemplary dissociative charge transfer process for isotope separation is shown in FIG. 1. Pure argon gas is introduced into the ionization zone 1 where the argon gas is ionized by either dc or ac discharge or by other means known in the art. The ionized argon gas flows into a reaction zone 2 where the isotopic molecular mixture of SF$_6$ gas is injected from a gas source 3 at a controlled rate based upon the argon ion concentration, the gas flow rate and the intensity of a continuous wave (cw) CO$_2$ laser 4. For room temperature SF$_6$ gas, the CO$_2$ laser 4 is operated on the P(20) to P(30), and preferably the P(26) to P(30) transitions of the CO$_2$ (00° 1–1° 00) band, whereby $^{32}$SF$_6$ will be selectively excited. The arrangement is preferably chosen such that the density ratio of Ar$^+$ to $^{34}$SF$_6$ in the reaction zone 2 is larger than the ratio of the cross section of excitation transfer (reaction (9)) to that of dissociative charge transfer (reaction (3)), as shown in (12). The dissociated ionic species $^{32}$SF$_5^+$ from the reaction zone is then directed through an ion separator 5 where the positive ions are drawn in a direction different than the balance of constituents by electrostatic force resulting in isotope separation. In another mode of separation the desired isotopic species $^{32}$SF$_5^+$ is neutralized through volume recombination with either electrons or negative ions. The neutralized $^{32}$SF$_5$ is then condensed out on the walls of a condenser 6. The temperature of the condenser wall is so adjusted such that $^{32}$SF$_5$ is the selective condensate.

Figure 2:
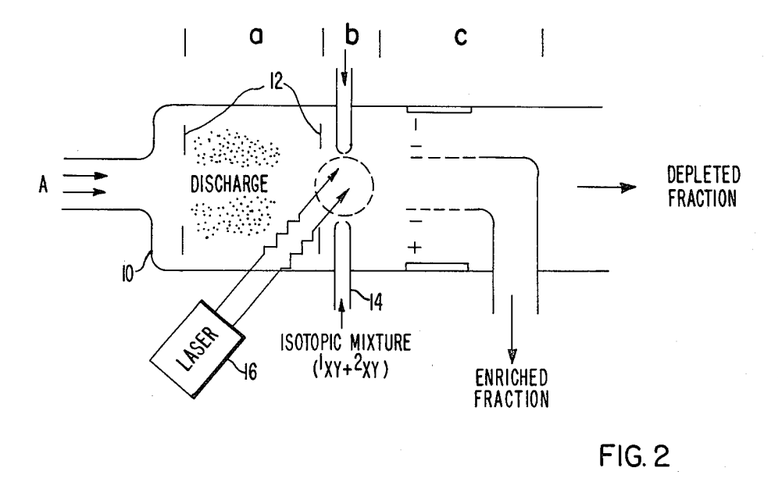
FIGS. 2 and 3 are schematic illustrations of apparatus in accordance with embodiments of this invention.

A relatively simple embodiment for utilizing a selective dissociative-charge-transfer process for isotope separation is illustrated in FIG. 2. Neutral gas A is fed into a flowing afterglow tube 10 from one end. The tube 10 includes three basic regions. Gaseous discharge is established in region "a" where electrons and ions A$^+$ are produced. The discharge can be accomplished through any of a number of means such as by plates 12 which set up an electric field in region "a". Electromagnetic wave, direct current, alternating current and microwave fields, among others, can also be utilized. The electrons and ions produced are carried downstream by the flowing gas. At an appropriate point downstream, region "b", gaseous mixture $^1$XY + $^2$XY is introduced into the flowing plasma through an inlet 14 and simultaneously radiation of proper frequency, for example, P(20) to P(30) lines of the CO$_2$ laser, is used to selectively irradiate the mixture of SF$_6$. The radiation is here shown as coming a laser 16. The stable positive product ions $^1$X$^+$, produced in accordance with reaction (3), can be collected further downstream in region "c", through mechanical, chemical or the electrical process shown. The system illustrated has many degrees of freedom through adjustment of such parameters as the gas pressure and temperature, flow velocity, discharge intensity, isotopic mixture feed density and laser intensity.

Electrons produced in the discharge also appear in the flowing afterglow. By proper location of the injection point of the isotopic mixture and hence selecting the proper energy of the electrons in the flowing afterglow, a selective dissociative electron attachment process can also be accomplished:

$$\begin{aligned} e^- + (^1XY)^\# + {}^2XY &\longrightarrow (^1XY^-)^\# + {}^2XY \\ &\longrightarrow {}^1X^- + Y + {}^2XY \end{aligned} \qquad (6)$$

The negative product ions $^1$X$^-$ produced in accordance with reaction (6) and the positive product ions $^1$X$^+$ produced in accordance with reaction (3) will recombine readily. For example, in the case of sulfur hexafluoride $$SF_5^- + SF_5^+ \rightarrow 2SF_4 + 2F \qquad (7)$$

Accordingly, a simplified separation process can be utilized in region "c", such as cooling the reaction products to condense the enriched SF$_4$ onto a removal surface.

For isotope separation of a uranium mixture, such as U$^{235}$F$_6$ and U$^{238}$F$_6$, similar dissociative charge transfer and dissociative electron attachment processes can be used. The threshold energy at which UF$_5^+$ is formed from UF$_6$ is 15.5±0.7 eV (J. R. White and A. E. Cameron, Phys. Rev. 71, 907, 1947). The argon ion is a preferred candidate for the process, although other ions can be utilized. As potential candidates for the primary positive ions A$^+$ for any dissociative charge transfer process for isotope separation, a whole spectrum of atoms and molecules with ionization potential ranging from as low as 3.87 eV (for cesium) to as high as 24.46 eV (for helium) exist.

The processes taught can be further extended to include a selective dissociative excitation transfer process for isotope separation. In reaction (3) a long-lived metastable excited species A* is substituted for the positive ion A$^+$:

$$A^* + (^1XY)^* + {}^2XY \rightarrow A + {}^1X^+ + Y + e^- + {}^2XY \qquad (8)$$

Here, the sum of the excitation energies of the species A* and ($^1$XY)* must be sufficient to cause reaction (8) to occur.

In any selective photo excitation process for isotope separation, a competing process to reduce the effectiveness and overall efficiency of separation is the undesired excitation transfer, such as $$(^1XY)^* + {}^2XY \rightarrow {}^1XY + (^2XY)^* \qquad (9)$$

The cross section of this process has been found to be in the range of 10$^{-14}$ to 10$^{-15}$ cm$^2$. However, the dissociative charge transfer process, reaction (3), is also expected to be large where near energy resonance occurs, as illustrated in the example of Ar$^+$ + (SF$_6$)*. In order to achieve a high separation factor in a practical device such as illustrated in FIG. 2, the selective dissociative charge exchange rate of reaction (3) must be higher than the excitation transfer rate of reaction (9). This criteria is satisfied if $$[A^+][^1XY^*]Q_{DCT}v_{r1} > [^1XY^*][^2XY]Q_{XT}v_{r2}, \quad (10)$$

where the brackets represent the particle density of the indicated species within a given reaction volume; $Q_{DCT}$ and $Q_{XT}$ are respectively the cross sections of the dissociative charge transfer process reaction (3), and the excitation transfer process reaction (9); and $v_{r1}$ and $v_{r2}$ are the relative velocities of the colliding partners in reactions (3) and (9), respectively.

The velocities are substantially equal, $$v_{r1} \approx v_{r2}, \quad (11)$$

and accordingly, a large separation factor can be achieved if $$\frac{[A^+]}{[^2XY]} > \frac{Q_{XT}}{Q_{DCT}} \quad (12)$$

Accordingly, once the cross sections $Q_{DCT}$ and $Q_{XT}$ are accurately known, one can control the gas A flow rate, the discharge condition and the neutral $^1XY+^2XY$ injection rate so that reaction (12) is satisified. Apparatus disclosed hereinafter, particularly with respect to FIG. 5, can be utilized for carrying out the discussed reactions.

It has been found that atoms in an atomic isotopic mixture, such as $U^{235}$ atoms in a mixture including atoms of $U^{238}$, can be selectively ionized by a resonance charge transfer process following selective excitation. The physical separation of the ions from the balance of constituents of the process is preferably achieved by apparatus utilizing radial ambipolar diffusion techniques (P. C. Stangeby and J. E. Allen, Nature 233, 472, 1971) or a combination of electrostatic and magnetohydrodynamic effects. This process advantageously eliminates the need for provision of an atomic beam of atoms, such as uranium atoms, as typically required.

It is known (J. B. Hasted, *Advances in Atomic and Molecular Physics*, Edited by D. R. Bates and I. Estermann (Academic Press, New York, 1968), p. 237) that the charge transfer cross section of $$A^+ + B \rightarrow A + B^+ + \Delta E, \text{ where } \Delta E \text{ is the energy released} \quad (13)$$

is very lage ($\approx 10^{-13}$ cm$^2$) if $\Delta E \approx 0$. The neutral species B in reaction (13) can be either in the ground state or in the excited states. For the exemplary separation of isotopes of uranium, $U^{235}$ atoms are selectively excited by, for example, monochromatic light such as dye laser radiation:

$$h\nu + U^{235} + U^{238} \rightarrow U^{235*} + U^{238} \quad (14)$$

The excited atoms $U^{235*}$ are then ionized by resonance charge transfer with ions $A^+$, $$A^+ + U^{235*} + U^{238} \rightarrow A + U^{235+} + U^{238} \quad (15)$$

As a more specific example, and

It is believed that the ionization potential of uranium is $6.22 \pm 0.5$ eV (see D. W. Steinhaus et al., *Present Status of the Analyses of the First and Second Spectra of Uranium (UI and UII) as Derived from Measurements of Optical Spectra*, Los Alamos Scientific Report LA-4501, October 1971) and the 5329.3 Å radiation and the Cs$^+$ ions in reactions (16) and (17) are chosen for illustration only, many other wavelengths and ions being equally applicable. Other wavelengths for selective excitation of $U^{235}$ are well known. The objective for a workable atomic charge transfer reaction for uranium is that the sum of the excitation energy of $U^{235}$ and the ionization energy of $A^+$ is substantially equal to, but no less than, the ionization energy of uranium 235. It is to be understood that while the exemplary reactions relate to atomic isotopic mixtures, the teaching is applicable to molecular isotopic mixtures.

Figure 3:
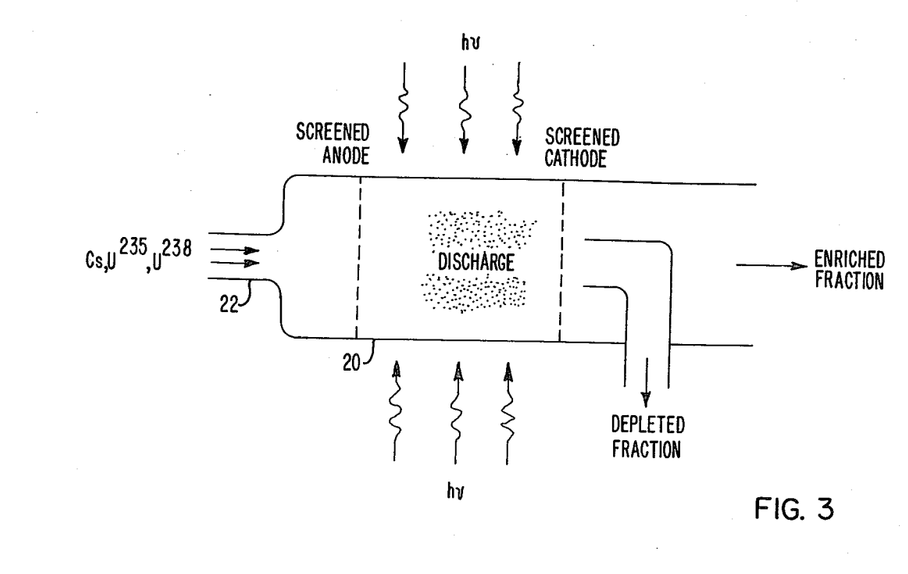
Figure 4:
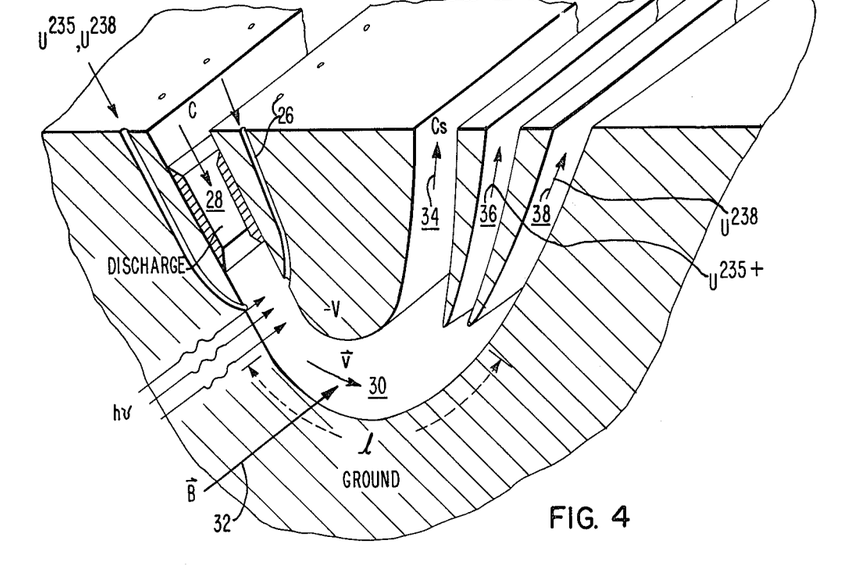
FIGS. 4 and 5 are perspective schematics of further apparatus in accordance with this invention.

One embodiment of apparatus for carrying out the disclosed process is shown in FIG. 3, and another in FIG. 4. While the exemplary cesium-uranium reaction is discussed, the process and apparatus are not to be construed as so limited.

In FIG. 3, cesium and uranium vapor are caused to flow into a discharge tube 20 through an inlet 22. A few Torr of a noble gas can advantageously be added to act as a buffer and maintain a stable glow discharge. Cesium atoms are readily ionized due to their low ionization potential. At the same time the discharge tube is irradiated with radiation of a predetermined frequency, such as monochromatic light so that $U^{235*}$ is produced and reacts with Cs$^+$ to form $U^{235+}$ according to reaction (15). The $U^{235+}$ ions drift toward the walls of the discharge tube under the influence of an ambipolar diffusion field which is formed by the discharge reaction. The enriched fraction can then be collected downstream as shown.

FIG. 4 shows apparatus particularly useful for high flow rates. The atomic uranium mixture is injected through ports 26 which supply the mixture downstream of a discharge zone 28 into a flowing cesium afterglow. Monochromatic radiation $h\nu$ is also introduced into the flowing medium in the area where uranium is injected. The $U^{235+}$ ions created by charge transfer are separated from the mixture by an electrostatic-magnetohydrodynamic enhanced nozzle technique as shown. This includes flow of the reaction products at a velocity $\vec{v}$ through a curved centrifuge passage or zone 30 in the presence of magnetic field $\vec{B}32$ acting in the direction perpendicular to the velocity shown. The various products, under the influence of the curved passage and the magnetic field, are deflected along different flow paths and collected in different segmented areas 34, 36, 38.

As illustrated above, most photon-assisted physical or chemical processes for isotope separation require, in addition to the isotopic mixture, electrons, ions or neutrals in some preferred state. For example, the photon-enhanced dissociative electron attachment process $$h\nu + {}^1XY + {}^2XY \rightarrow ({}^1XY)^* + {}^2XY \quad (2)$$

and $$e^- + ({}^1XY)^* \rightarrow {}^1X^- + Y, \quad (18), (6)$$

requires a well defined range of electron (e$^-$) energies. Similarly, the dissociative charge transfer process $$h\nu + {}^1XY + {}^2XY \rightarrow ({}^1XY)^* + {}^2XY \quad (2)$$

and $$A^+ + ({}^1XY)^* + {}^2XY \rightarrow {}^1X^+ + Y + A + {}^2XY \quad (3)$$

requires an ion ($A^+$) with appropriate ionization potential. And, the photo-chemical process $$h\nu + {}^1X + {}^2X \rightarrow {}^1X^* + {}^2X \quad (19), (14)$$

and $$AB + {}^1X^* + {}^2X \rightarrow {}^1XB + A + {}^2X \quad (20)$$

or $$B + {}^1X^* + {}^2X \rightarrow {}^1XB + {}^2x \quad (21)$$

requires neutrals AB or B which may be chemical radicals produced in a discharge. Any exemplary photo-chemical process, utilizing mercury, is discussed in the referenced Chen application with regard to reactions (14) through (17) therein.

Figure 5:
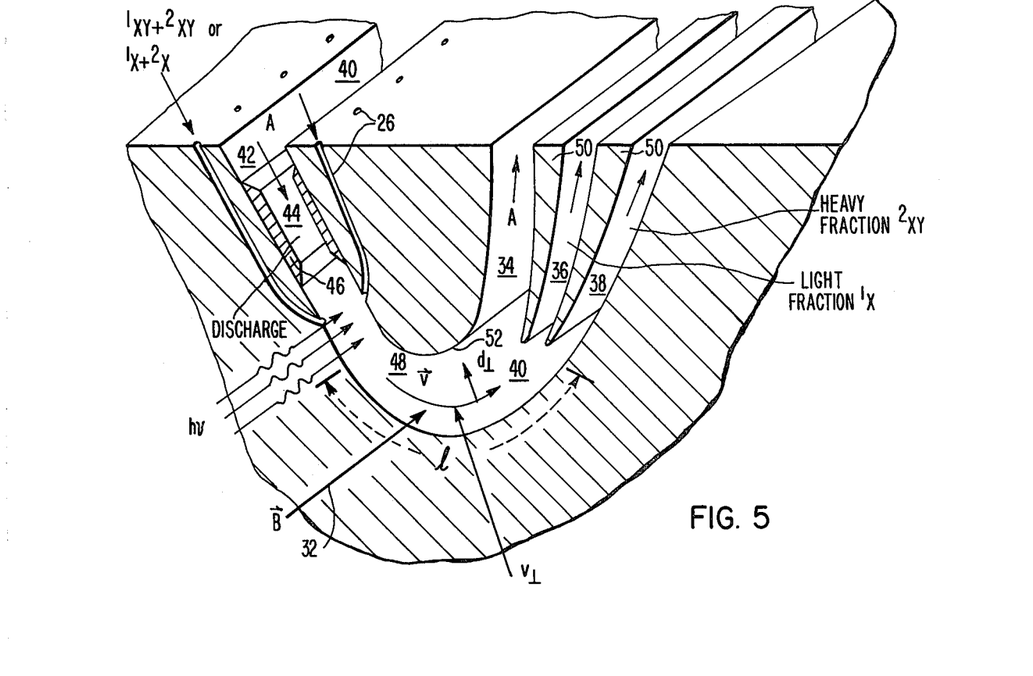

The arrangement disclosed and illustrated in FIG. 5 not only provides the capability to perform all of these processes, but also provides distinct operational, cost and efficiency advantages as compared to prior art arrangements. The present system for isotope separation combines the principle of aerodynamic mass separation and $v = \vec{B}$ drift of a moving charged particle (velocity $\vec{v}$) in a magnetic field, $\vec{B}$. In addition, the teaching of the present invention utilizes flowing afterglow for positive ion production for a selective-dissociative charge transfer process for isotope separation. The electrons produced in the discharge can be used for space charge neutralization or negative ion production for further improvement of efficiency of isotope separation. An optical cavity can also be created in the discharge zone for further improvements in overall efficiency.

As shown in FIG. 5, flowing gas A (or AB), enters the passage 40 from an inlet area 42. A glow discharge is struck in a discharge zone 44, for example, by discharge means such as a pair of electrodes 46. The electrons for reaction (18) or $A^+$ ions for reaction (3) are carried by the flow downstream where the mixture of isotopes $^1XY$ and $^2XY$ or $^1X$ and $^2X$ is injected into the stream. At the same time, these constituents are irradiated with a narrow line radiation ($h\nu$), such as from tunable dye laser. The selectively created isotopic species $^1X^-$ from reaction (18), or $^1X^+$ from reaction (3) then enters an aerodynamic mass separation or curved centrifuge section 48 of the system with a flowing velocity $\vec{V}$.

The aerodynamic mass separator 48 employs the centrifugal force upon particles traversing a curved path and takes advantage of the enhanced mass difference between isotopic species as a result of the effected reaction process. The heavier isotopic species $^2XY$ traverses a flow path to the outer channel 38, formed by fingers 50, while the lighter species $^1X^-$, or $^1X^+$, prefers an inner channel 36 for exit and collection, resulting in separation.

The mass separation can be enhanced further by magnetohydrodynamic means since $^1X^-$, or $^1X^+$, is a charged particle for some period of time subsequent to formation. A dc magnetic field, $\vec{B}$, is applied transverse to the constituent flow $\vec{v}$ such that a Hall field $\vec{v} \times \vec{B}$ is developed across the flow passage 40. Thus the charged isotopic species under the influence of this field are caused to deflect toward the inner wall 52 of the passage 48, thereby enhancing the mass separation.

In the limiting case of no collisions, the ion drift velocity v, across the magnetic field and the drift distance d, due to the Hall effect at the end of the centrifugal section of length 1 are $$v_\perp = \frac{eBl}{M_i} \text{ in cm/sec} \quad (22)$$

and $$d_\perp = \frac{eBl^2}{2M_iv} \text{ in cm,} \quad (23)$$

respectively. Here $M_i$ is the mass of the ion formed from, for example, selective dissociative charge transfer; e is the charge of the ion in esu; 1 is the length of the centrifugal section, v is the flowing gas velocity in cm/sec; and B is the transverse magnetic field in gauss. In the event collision of the ionic species with the buffer gas occurs, the drift velocity and distance can also be predetermined. The curvature and length of the centrifugal section together with other parameters of the arrangement such as exit channel widths can be tailored to achieve optimum isotope separation.

A practical example of utilization of the present arrangement is an application to uranium or sulfur isotope separation using, for example, $SF_6$ (or $UF_6$) gas. Argon gas is introduced into the device at inlet 42. The gas is ionized while passing through the pair of electrodes 46 where an adequate field, either ac or dc, is maintained. Downstream of the discharge zone about 100 $\mu$sec in the afterglow region, an isotopic mixture of $SF_6$ gas is injected into the ionized gas stream. Simultaneously a cw $CO_2$ laser operated on the P(20) to P(30) and preferably the P(26) to P(30) transitions of the $CO_2$ (00° 1-1° 00) band is beamed at the injection zone so that the $^{32}SF_6$ isotope is selectively excited. The intensity of the laser beam is such that a high concentration of $^{32}SF_6$ is excited to the upper vibrational states where dissociative charge transfer with $Ar^+$ ions is effective. The mixture of reaction products then flows into the curvilinear region where both centrifugal force and $\vec{v} \times \vec{B}$ force act upon the charged particles. Spatial separation of molecules and other species of different mass is achieved and enrichment of the particle isotopic species $^{32}S$ is obtained by proper location of the exit channel.

It will be apparent to those skilled in the art that the disclosed arrangement provides a convenient and practical means, such as electrical discharge, for provision of atomic or molecular species or chemical radicals not otherwise readily available for photochemical or other isotopic separation processes. Additionally, as a result of the discharge afterglow, the mean electron energy can be provided over a broad range, compatible with a large number of species, by varying the point of injection of the isotopic mixture downstream in the afterflow. The energy can range from, for example, 1 eV to 0.03 eV. Further, the energy spread of the electrons in the afterflow at a selected downstream distance is smaller than that typically obtained with an electron beam. Also, the electron density obtainable is in the range of $10^9$ to $10^{11}$ cm$^{-3}$, which is substantially higher than the density obtainable with an ordinary electron beam in the same energy range. Complex electron beam formation apparatus is therefor eliminated.

Figure 6:
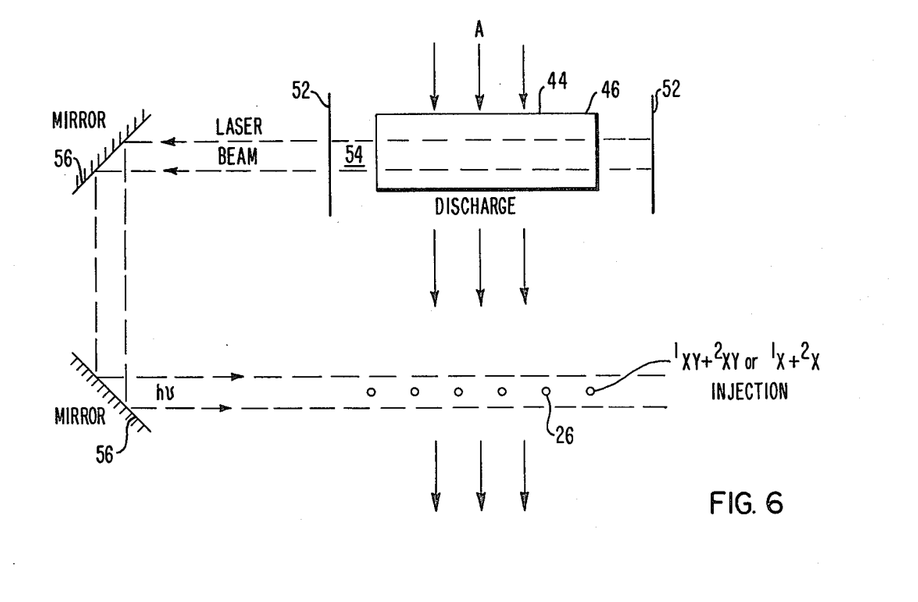
FIGS. 6 and 7 are schematic illustrations of additional embodiments of the apparatus of FIGS. 4 and 5.
Figure 7:
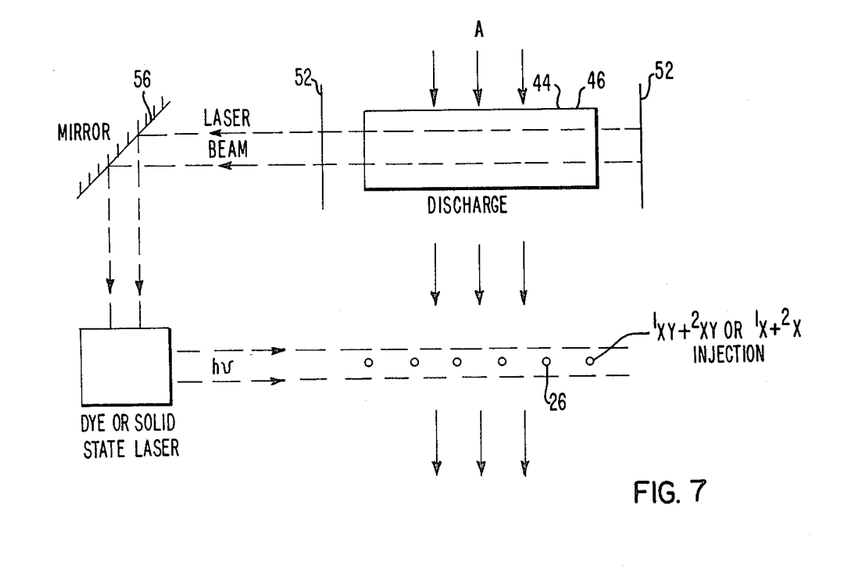

Additional arrangements can also be advantageously utilized to further benefit the disclosed system and provide increased system efficiency. FIGS. 6 and 7 illustrate arrangements where the energy input to the discharge, typically electrical energy, can be partially extracted as laser energy and used, respectively, directly or indirectly for the separation process. In both of the figures the discharge area is modified, such as by the addition of mirrors 52, to form an optical cavity 54. As shown in FIG. 6, the resulting laser beam can then be directed, through additional mirrors 56, to perform the irradiating function where proper photon wavelengths are obtained from the discharge. As shown in FIG. 7, the resulting laser beam can also be utilized to pump another laser, such as a dye or solid state unit, which performs the irradiating function.

Further modifications and additions are possible in view of the above teachings. It therefore is to be understood that within the scope of the claims, the inventive embodiments can be practiced other than as specifically described.

What is claimed is:

1. Apparatus for separating isotopes in an isotopic mixture having a first species including a first isotope of a particular element and a second species including a second isotope of said element, said apparatus comprising:
   structure defining a flow passage, said passage serially including means for inletting a flowing gas, means for passing said inletted flowing gas through a curved centrifuge section having an inner radius of curvature and an outer radius of curvature, and means for segmenting said passage into a plurality of outlets including an inner segment disposed toward said inner radius and an outer segment disposed toward said outer radius;
   means for creating a magnetic field within said centrifuge section;
   means for creating a discharge zone between said gas inlet means and said centrifuge section;
   means for injecting said mixture in a gaseous phase into said flow passage downstream of said discharge means; and
   means for irradiating said injected mixture between said injecting means and at least a portion of said centrifuge section so as to selectively excite said first species.

2. Apparatus for separating isotopes in an isotopic mixture having a first species including a first isotope of a particular element and a second species including a second isotope of said element, said apparatus comprising:
   means for creating an electrical discharge zone;
   means for flowing a selected gas through said zone;
   means for injecting said mixture into said flowing gas a preselected distance downstream of said discharge zone such that said mixture flows in a direction substantially similar to the flow of said gas;
   means for irradiating said mixture subsequent to said injection so as to selectively excite said first species and cause a predetermined release of reaction products, some of said products being of differing mass and including a species of said first isotope in a form different than its initial form prior to said irradiation;
   curved means for deflecting said products of differing mass along differing flow paths;
   means for creating a magnetic field in the region of said curved deflecting means; and
   means for collecting said deflected products including a segment for collecting said species of said first isotope in a different form.

* * * * *